US010532286B2

(12) United States Patent
Lord et al.

(10) Patent No.: US 10,532,286 B2
(45) Date of Patent: Jan. 14, 2020

(54) REACTIVE EMITTERS OF A VIDEO GAME EFFECT BASED ON INTERSECTION OF COVERAGE AND DETECTION ZONES

(71) Applicant: Activision Publishing, Inc., Santa Monica, CA (US)

(72) Inventors: Josh Lord, Santa Monica, CA (US); Stephen Miller, Santa Monica, CA (US); David Rowe, Santa Monica, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 778 days.

(21) Appl. No.: 14/267,824

(22) Filed: May 1, 2014

(65) Prior Publication Data
US 2015/0314194 A1    Nov. 5, 2015

(51) Int. Cl.
*A63F 13/577* (2014.01)
*A63F 13/28* (2014.01)
*A63F 13/69* (2014.01)
*A63F 13/57* (2014.01)

(52) U.S. Cl.
CPC ........... *A63F 13/577* (2014.09); *A63F 13/28* (2014.09); *A63F 13/57* (2014.09); *A63F 13/69* (2014.09); *A63F 2300/64* (2013.01); *A63F 2300/643* (2013.01); *A63F 2300/65* (2013.01); *A63F 2300/8029* (2013.01)

(58) Field of Classification Search
None
See application file for complete search history.

(56) References Cited

U.S. PATENT DOCUMENTS

| | | | |
|---|---|---|---|
| 6,349,301 B1* | 2/2002 | Mitchell | A63F 13/12 |
| 2004/0063501 A1* | 4/2004 | Shimokawa | A63F 13/10 463/49 |
| 2004/0104912 A1* | 6/2004 | Yamamoto | A63F 13/08 345/473 |
| 2004/0166934 A1* | 8/2004 | Nakata | A63F 13/10 463/30 |
| 2006/0149516 A1* | 7/2006 | Bond | A63F 13/10 703/6 |
| 2006/0223637 A1* | 10/2006 | Rosenberg | A63F 13/10 463/47 |
| 2006/0258445 A1* | 11/2006 | Nishimori | A63F 13/10 463/30 |
| 2011/0244957 A1* | 10/2011 | Nishimura | A63F 13/10 463/31 |
| 2012/0263310 A1* | 10/2012 | Fournel | A63F 13/10 381/61 |
| 2013/0331189 A1* | 12/2013 | Ogrin | A63F 13/10 463/42 |

OTHER PUBLICATIONS

AMslimfordy, Angry Birds Short Fuse Level 26-15 Walkthrough, Nov. 26, 2013, https://www.angrybirdsnest.com/angry-birds-short-fuse-level-26-15-walkthrough/.*

Auluflwaffles, Mass Effect 3 Multiplayer and Singleplayer Guide: Using Shockwave Effectively, Mar. 31, 2012, https://auluftwaffles.com/2012/03/31/mass-effect-3-multiplayer-and-singleplayer-guide-using-shockwave-effectively/.*

* cited by examiner

*Primary Examiner* — Jason T Yen
(74) *Attorney, Agent, or Firm* — Vista IP Law Group LLP

(57) ABSTRACT

A reactive emitter associated with an object in a video game emits an asset in response to a secondary effect of an activity that occurs in the video game within a vicinity of the object.

14 Claims, 3 Drawing Sheets

REACTIVE EMITTERS OF A VIDEO GAME EFFECT BASED ON INTERSECTION OF COVERAGE AND DETECTION ZONES

FIELD OF THE INVENTION

The present invention relates generally to video games, and more specifically to special effects used in video games.

BACKGROUND OF THE INVENTION

The fun and excitement associated with many video games is increased when audio and visual effects are similar to real-life sounds and images. This is especially true with action combat games involving shooting and other weapons. Sounds may be related to an environmental activity or an impact activity.

Environmental activity refers to activity surrounding the video game characters, such as flies buzzing, water running in a river, footsteps of a character running, a car engine running, etc. The sounds associated with environmental activities are typically not reactive, but rather are static in that they exist to enhance the presence of the object or person ("object" is used hereafter to refer to a physical object, person, or other living creature). Impact activity refers to "direct hits" on an object, such as a car blowing up from an explosive, a window shattering from a bullet, an alien or bad guy being shot, etc. The sounds associated with impact activities are typically due to the "direct hit."

In real life, objects may also react to secondary effects of an environmental or impact activity. For example, if a bomb explodes, a nearby fence may rattle in response to the resulting shockwave. Thus, the overall video game experience could be enhanced if the effect associated with an environmental and/or impact activity includes an output asset (e.g., audio, visual, audio-visual effect) triggered by a force other than a direct hit, to create a more real-life sensation during video game play. In other words, the asset is output in response to a secondary effect of the activity, such as the shockwave of an explosion. This adds to the player's envelopment in the virtual play space.

SUMMARY OF THE INVENTION

The output of an object in a video game includes an asset triggered by a secondary force, i.e., a force other than a direct hit on the object. Typically the force will be a secondary force from an environmental activity or an impact activity. The trigger is accomplished by a "reactive emitter," which is a property associated with the object that is programmed into the video game to react to the secondary force.

In preferred embodiments of the present invention, a method includes assigning a coverage zone to an activity in the video game, assigning a detection zone to an object in the video game, determining the coverage zone intersects with the detection zone, and causing the object to emit the asset based on the intersection of the coverage zone and the detection zone. The coverage zone is the area affected by a secondary effect of the activity. The detection zone is an area in the vicinity of the object.

The asset may be an audio asset, a video asset, or an audio-video asset. The coverage zone and detection zone are typically substantially spherical, defined by a coverage radius and detection radius respectively. The activity is typically an explosion, and the secondary effect is a shockwave of the explosion.

The output asset may vary in size/intensity based on the magnitude of intersection of the coverage zone and the detection zone. The output asset may also vary based on the type of object and/or the type of activity. If the output asset includes an audio component, the properties affected by these parameters may be pitch, volume, duration, and frequency.

DETAILED DESCRIPTION OF THE EMBODIMENTS

Figure 4:
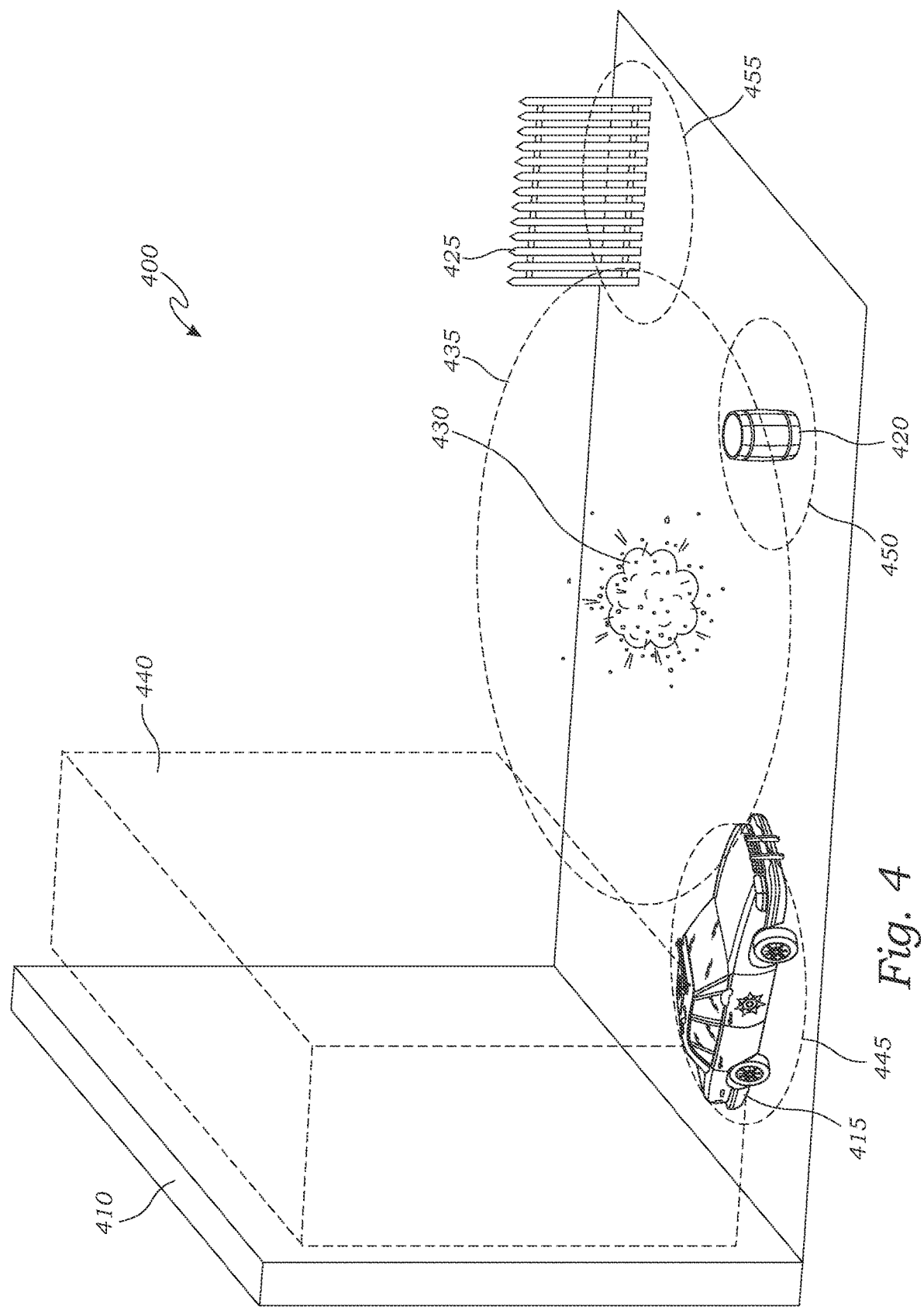
FIG. 4 shows a partial scene of a video game illustrating the coverage zone of an explosion intersecting with detection zones of various objects.

Preferred embodiments of the present invention will now be described with reference to the above-described drawings. Beginning with FIG. 4, a partial scene 400 from within a video game is shown, in which an explosion 430 is occurring. The scene 400 includes a building wall 410, a car 415, a barrel 420, and a fence 425. Also shown in FIG. 4 are dotted lines representing coverage zone 435 of the explosion 430, and detection zones 440, 445, 450, and 455, of the wall 410, car 415, barrel 420, and fence 425 respectively. The dotted lines are for illustration purposes only, and would not be visible during video game play as part of the scene 400 or otherwise.

Coverage zone 435 is shown as substantially circular, as are detection zones 445, 450, and 455. These zones could be any shape, including three-dimensional shapes such as substantially spherical. Detection zone 440 of wall 410 is shown as three-dimensional, specifically in the shape of a rectangular prism corresponding to the shape of the wall. Coverage zone 435 of explosion 430 represents the area affected by the shockwave of the explosion. In FIG. 4, coverage zone 435 extends radially outward from the point of origin of explosion 430, and intersects with each of detection zones 410, 415, 420, and 425. Thus, in accordance with preferred embodiments of the present invention, the shockwave of explosion 430 in scene 400 would cause each of objects 410, 415, 420, and 425 to emit one or more assets. For example, as further described herein: wall 410 might shake, creak, and/or wobble etc.; car 415 might roll, tilt, spin, become airborne, have an airbag go off, have an alarm go off, and/or have the horn honk, etc.; barrel 420 might crack, split, roll, spin, become airborne, and/or discharge some or all of its contents, etc.; and fence 425 might rattle, buckle, and/or bend, etc. Various real-life sounds could be associated with the aforementioned.

Figure 1:
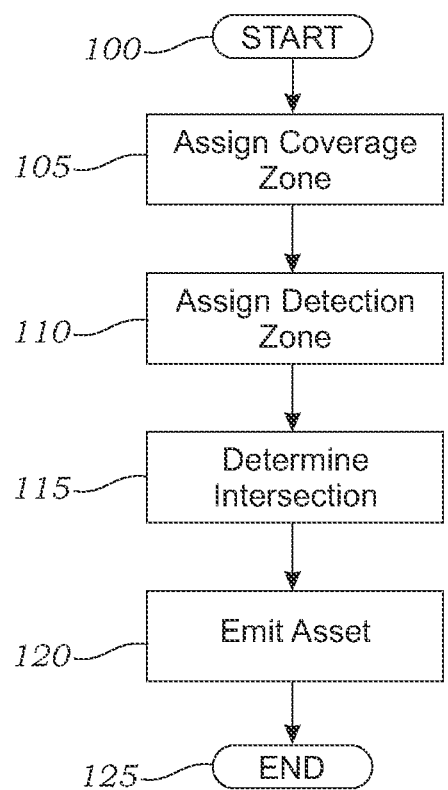
FIG. 1 is a flowchart of a method of the present invention.

Turning now to FIG. 1, a method to output an asset in a video game in accordance with the present invention is illustrated in a flowchart. The method begins at Step 100. At Step 105, a coverage zone is assigned to a secondary effect of an activity in the video game. The activity may be any activity generating a shockwave, pressure wave, or other secondary force. For example, the activity may be an explosion (as illustrated in FIG. 4) from a bomb, grenade, rocket, missile, or any other type of explosive. The activity may be a weather event or natural phenomenon such as an earthquake, lightning strike, hurricane, tornado, tsunami, volcanic eruption, etc. The activity may be a sonic boom from an aircraft, or a force wave from a supernatural power. The activity may be recoil or reverberation from firing a weapon, or a shockwave from a large building falling or an aircraft crashing.

Figure 3:
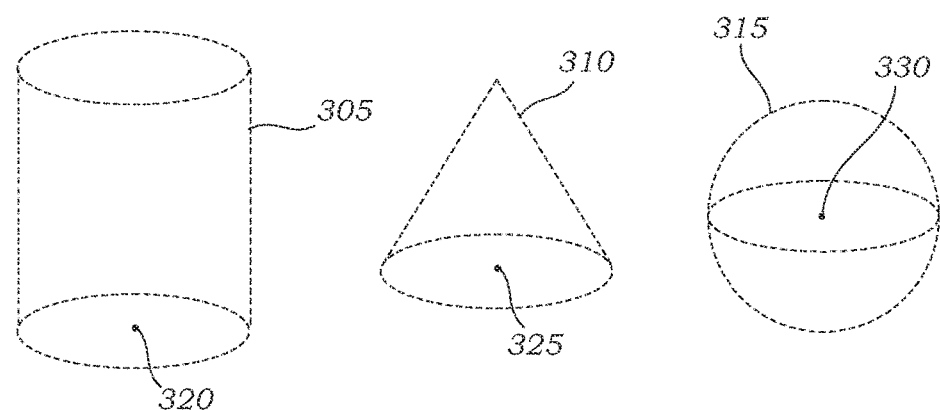
FIG. 3 illustrates various 3-dimensional coverage zones and detection zones.

The coverage zone represents the area affected by the secondary effect of the activity. Typically the coverage zone is substantially spherical, and thus is defined by a coverage radius. When the activity is an explosion, the coverage radius is a blast radius. However, the coverage zone may be any geometric shape or irregular area, and may even be three-dimensional. Various three-dimensional coverage zones are shown, e.g., in FIG. 3. Specifically: a cylindrical zone 305 is shown for an activity centered at 320; a conical zone 310 is shown for an activity centered at 325; and a spherical zone 315 is shown for an activity centered at 330.

The coverage zone is programmed into the video game by associating the zone with the activity. The coverage zone may be constant for the activity, or may vary depending on other parameters. For example, a certain type of explosion may always have a blast radius of 15 feet, or that type of explosion may have a blast radius varying from 5 feet to 25 feet, depending on parameters such as which character triggered the explosion, the weather conditions, whether the weapon causing the explosion has been enhanced, etc. Or the range may be randomly generated. Multiple activities may have corresponding coverage zones assigned to their corresponding secondary effects at Step 105. The coverage zones may be assigned as part of the video game development, or dynamically during video game play.

At Step 110, a detection zone is assigned to an object in the video game. Objects may be fences, barrels, walls, windows, cars or other vehicles, boxes, poles, trees, bushes, dirt, leaves, rocks, water, structures, or anything else. Multiple objects may be assigned corresponding detection zones at Step 110. Assignment of detection zones to objects may occur before, after, or simultaneously with assigning coverage zones to the secondary effects of activities at Step 105. The detection zones may be assigned as part of the video game development, or dynamically during video game play. Various detection zones 440, 445, 450, and 455 are shown in FIG. 4. Typically detection zones are substantially spherical, and thus are defined by a detection radius.

During video game play, when an activity occurs having a coverage zone, if the coverage zone intersects with the detection zone of an object, the object will emit an asset based on the intersection. Determination of the intersection occurs at Step 115, and is discussed in more detail herein with reference to FIGS. 2 and 3. The object emits the asset at Step 120. The asset may be audio, visual, audio-visual, or even another sensory asset such as a smell, flavor, or tactile output. The asset may have properties associated therewith, and the values of those properties are referred to herein as the asset's payload. For example, a sound asset may have properties of pitch, volume, duration, frequency, etc., each assigned a value. A video asset may have properties of direction, speed, condition, color, axis of rotation, discharge, deformation, etc., each assigned a value.

As an example, if an explosion occurs generating a shockwave with a coverage zone intersecting the detection zone of a barrel, the barrel may shake, roll, break, and discharge its contents, all with accompanying lifelike sounds. Similarly, if the coverage zone intersects the detection zone of a car, the car may spin, become airborne, and have its hood pop off when it lands, all with accompanying lifelike sounds. If the coverage zone intersects the detection zone of a fence, the fence may rattle, buckle, or dislodge, all with accompanying lifelike sounds. If the coverage zone intersects the detection zone of a wall or building, the wall or building may shake, crumble, crack, or have portions dislodged, all with accompanying lifelike sounds.

The scope and extent of the asset or assets emitted may be determined by various factors. For example, an object may have fixed assets associated therewith. In such a case, the object would emit the same asset(s) whenever its detection zone intersected a coverage zone. Or an object may have various fixed assets associated therewith corresponding to various known activities. In such a case, the asset(s) emitted would depend on the activity associated with the coverage zone intersecting the object's detection zone. Various objects may have various assets assigned thereto depending on the type of the object. Objects may be classified into different types such as human, inanimate, extraterrestrial, etc., and may be further classified into sub-types such as by size, stability, foundation, material composition, etc. Such classifications may be determined at the programming level (as may classifications of activities).

Further, the payload of an asset may depend on various factors. For example, the payload may vary as the magnitude of the intersection between the coverage zone and the detection zone varies. In other words, if an object's detection zone barely intersects an activity's coverage zone, the payload may be minimal, whereas if the object's detection zone significantly intersects an activity's coverage zone, the payload may be more significant. The payload may also vary depending on the type of object (as previously described) and/or the type of activity. Activities may be classified into different types such as weather, explosion, structural, supernatural, etc. Or each activity may have its own unique payload associated therewith. An activity with a short duration and high frequency may cause the object to emit a short more "pingy" payload as compared to a longer low-frequency activity.

Figure 2:
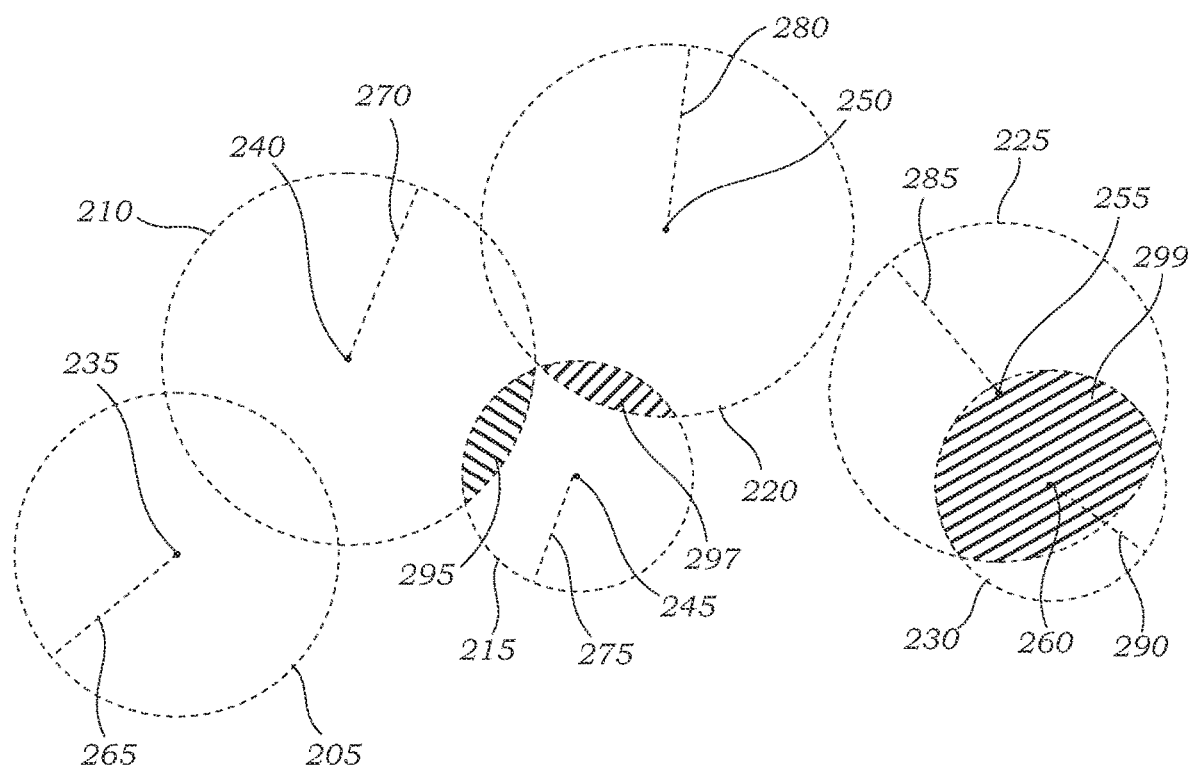
FIG. 2 is a geometric diagram showing intersections of various two-dimensional coverage zones and detection zones.

Turning now to FIG. 2, intersections of various two-dimensional coverage zones (205, 210, 220, and 225) and detection zones (215 and 230) are shown in a geometric diagram. The coverage zones 205, 210, 220, and 225 represent areas affected by secondary effects of various activities centered at 235, 240, 250, and 255 respectively. The zones are all circular, and thus have coverage radii 265, 270, 280, and 285 respectively. The activities may occur substantially simultaneously or at different times during the video game. The detection zones 215 and 230 represent areas in the vicinities of objects centered at 245 and 260 respectively, and are also circular and thus have detection radii 275 and 290 respectively.

As can be seen, not all of the coverage zones 205, 210, 220, and 225 intersect both of the detection zones 215 (for object centered at 245) and 225 (for object centered at 260). Starting with coverage zone 205 of activity centered at 235, this zone does not intersect with either of detection zones 215 or 230. Thus, occurrence of this activity would not cause either of those objects to emit an asset. Coverage zones 210 and 220 intersect detection zone 215, but does not intersect detection zone 230. Thus, occurrence of the activities centered at 240 and 250 would cause the object centered at 245 to emit an asset, but would not cause the object centered at 260 to emit an asset. And coverage zone 225 intersects detection zone 230, but does not intersect detection zone 215. Thus, occurrence of the activity centered at 255 would cause the object centered at 260 to emit an asset, but would not cause the object centered at 245 to emit an asset.

As already mentioned, the output asset may vary in intensity based on a determination of the magnitude of intersection of the coverage zone and the detection zone. For example, the asset's payload may increase as the magnitude of the intersection between the coverage zone and the detection zone increases. Determination of the size/intensity of the payload may be based on a percent of intersection of the coverage zone and detection zone, and/or some other linear or exponential function dependent on proximity of the activity to the object, intervening obstacles, etc. In FIG. 2, for example, coverage zones 210 and 220 intersect with detection zone 215 at 295 and 297 respectively. Those intersections are small compared to intersection 299 of coverage zone 225 and detection zone 230. Thus, if a payload is directly proportional to the magnitude of intersection, the payload of the object centered at 260 based on the activity centered at 255 would be greater than the payload of the object centered at 245 based on either of the activities centered at 240 or 250.

As an example of modifying assets based on the magnitude of intersection of the applicable coverage zone and detection zone, a barrel at 245 might react to activity at 240 or 250 by slightly wobbling or tilting over, with a low volume corresponding sound. On the other hand, a barrel at 260 might react to activity at 255 by being ejected into the air and breaking apart, with loud thuds as the pieces land. Any or all of audio properties of pitch, volume, duration, and frequency, may be adjusted accordingly based on the magnitude of intersection.

Also as already mentioned, the output asset may vary based on the type of object and/or the type of activity. For example, all metal objects may have specific sounds associated with them, whereas all liquid objects may have other specific sounds associated with them. Objects may be classified as broadly or narrowly as is desired. Likewise, activities may be classified as broadly or narrowly as desired. An object's output asset(s) may depend on the type of activity associated with the coverage zone. Such assets for any object or type/class of objects may be mapped to any activity or class/type of activity as desired.

Additionally, detection areas may vary for an object, depending on the type of activity. For example, a barrel might have one detection zone for weather-related activities, and a different detection zone for explosions. Or the barrel might have one detection zone for earthquakes, and a different detection zone for lightning strikes. Detection zones may also be randomly generated.

Although particular embodiments have been shown and described, the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims. The invention, therefore, should not be limited, except to the following claims, and their equivalents.

What is claimed is:

1. A method of outputting an asset and exhibiting a simulated physical effect in a video game being played by a user, comprising:
   assigning a coverage zone to a secondary effect of an activity in the video game, the secondary effect simulating a force caused by the activity;
   assigning a detection zone to an object in the video game;
   determining the coverage zone intersects with the detection zone;
   determining a magnitude of the intersection;
   assigning a payload to an asset dependent at least partially on the magnitude of the intersection and at least partially on a factor from the group consisting of activity type and object type, the asset corresponding to a simulated physical effect of the simulated force acting on the object;
   causing the object to emit the asset based on the intersection of the coverage zone and the detection zone, and
   exhibiting the simulated physical effect perceivable by the user playing the video game.

2. The method of claim 1, wherein the asset is an audio asset.

3. The method of claim 2, wherein the detection zone is substantially spherical and is defined by a detection radius.

4. The method of claim 3, wherein the activity is an explosion.

5. The method of claim 1, wherein assigning the payload to the asset further comprises assigning a value to a property of the asset from the group consisting of pitch, volume, duration, frequency.

6. The method of claim 3, wherein the coverage zone is substantially spherical and is defined by a coverage radius.

7. The method of claim 2, wherein the coverage zone is substantially spherical and is defined by a coverage radius.

8. The method of claim 2, wherein the activity is an explosion.

9. The method of claim 1, wherein the detection zone is substantially spherical and is defined by a detection radius.

10. The method of claim 9, wherein the coverage zone is substantially spherical and is defined by a coverage radius.

11. The method of claim 1, wherein the coverage zone is substantially spherical and is defined by a coverage radius.

12. The method of claim 1, wherein the activity is an explosion.

13. A method of outputting an asset and exhibiting a simulated physical effect in a video game being played by a user, comprising:
   assigning a coverage zone to a secondary effect of an activity in the video game, the secondary effect simulating a force caused by the activity;
   assigning a detection zone to an object in the video game;
   determining the coverage zone intersects with the detection zone;
   determining a magnitude of the intersection;
   assigning a payload to the asset dependent at least partially on the magnitude of the intersection and at least partially on a factor from the group consisting of activity type and object type, the asset corresponding to a simulated physical effect of the simulated force acting on the object;
   causing the object to emit the asset based on the intersection of the coverage zone and the detection zone; and
   exhibiting the simulated physical effect perceivable by the user playing the video game.

14. The method of claim 13, wherein assigning the payload to the asset further comprises assigning a value to a property of the asset from the group consisting of pitch, volume, duration, frequency.

* * * * *